(12) United States Patent
Kamat et al.

(10) Patent No.: US 9,961,130 B2
(45) Date of Patent: May 1, 2018

(54) DISTRIBUTED HIGH AVAILABILITY PROCESSING METHODS FOR SERVICE SESSIONS

(71) Applicant: A10 NETWORKS, INC., San Jose, CA (US)

(72) Inventors: Gurudeep Kamat, San Jose, CA (US); Swaminathan Sankar, San Jose, CA (US)

(73) Assignee: A10 NETWORKS, INC., San Jose, CA (US)

( * ) Notice: Subject to any disclaimer, the term of this patent is extended or adjusted under 35 U.S.C. 154(b) by 251 days.

(21) Appl. No.: 14/261,365

(22) Filed: Apr. 24, 2014

(65) Prior Publication Data

US 2015/0312322 A1    Oct. 29, 2015

(51) Int. Cl.
*G06F 15/16* (2006.01)
*H04L 29/08* (2006.01)
*G06F 12/12* (2016.01)

(52) U.S. Cl.
CPC .............. *H04L 67/10* (2013.01); *G06F 12/12* (2013.01); *H04L 67/1008* (2013.01)

(58) Field of Classification Search
CPC .......................... H04L 61/1511; G06F 21/554
See application file for complete search history.

(56) References Cited

U.S. PATENT DOCUMENTS

| | | | |
|---|---|---|---|
| 4,475,192 A | 10/1984 | Fernow et al. | |
| 5,042,032 A | 8/1991 | Dighe et al. | |
| 5,732,041 A | 3/1998 | Joffe | |
| 5,822,512 A | 10/1998 | Goodrum et al. | |
| 5,859,835 A | 1/1999 | Varma et al. | |
| 5,909,686 A | 6/1999 | Muller et al. | |
| 5,935,207 A | 8/1999 | Logue | |
| 5,960,174 A | 9/1999 | Dew | |
| 6,047,000 A | 4/2000 | Tsang et al. | |
| 6,058,116 A | 5/2000 | Hiscock et al. | |

(Continued)

FOREIGN PATENT DOCUMENTS

| | | |
|---|---|---|
| CN | 1554055 A | 12/2004 |
| CN | 101019387 A | 8/2007 |

(Continued)

OTHER PUBLICATIONS

Parekh et al., "A generalized processor sharing approach to flow control in integrated services networks: the single node case," IEEE/ACM Trans. Networking, pp. 344-357, Jun. 1993.

(Continued)

*Primary Examiner* — Umar Cheema
*Assistant Examiner* — Tesfu N Mekonen
(74) *Attorney, Agent, or Firm* — AMPACC Law Group, LLP; Keith Kline

(57) ABSTRACT

Provided are methods and systems for processing a data packet associated with a service session. The data packet directed to a first servicing node can be received by a forwarding node. The forwarding node can determine that the first servicing node is unavailable. Based on the determination, the forwarding node can select a second servicing node from a plurality of servicing nodes. The selection can be based on a high availability policy. The forwarding node can then send the data packet to the second servicing node.

20 Claims, 9 Drawing Sheets

(56) References Cited

U.S. PATENT DOCUMENTS

| | | | |
|---|---|---|---|
| 6,118,768 A | 9/2000 | Bhatia et al. | |
| 6,134,217 A | 10/2000 | Stiliadis et al. | |
| 6,314,501 B1 | 11/2001 | Gulick et al. | |
| 6,359,861 B1 | 3/2002 | Sui et al. | |
| 6,430,156 B1 | 8/2002 | Park et al. | |
| 6,438,134 B1 | 8/2002 | Chow et al. | |
| 6,470,016 B1 | 10/2002 | Kalkunte et al. | |
| 6,532,213 B1 | 3/2003 | Chiussi et al. | |
| 6,532,501 B1 | 3/2003 | McCracken | |
| 6,560,230 B1 | 5/2003 | Li et al. | |
| 6,577,596 B1 | 6/2003 | Olsson et al. | |
| 6,594,701 B1 | 7/2003 | Forin | |
| 6,650,641 B1 | 11/2003 | Albert et al. | |
| 6,654,374 B1 | 11/2003 | Fawaz et al. | |
| 6,674,721 B1 | 1/2004 | Dittia et al. | |
| 6,714,517 B1 | 3/2004 | Fawaz et al. | |
| 6,735,206 B1 | 5/2004 | Oki et al. | |
| 6,735,210 B1 | 5/2004 | Lindeborg et al. | |
| 6,765,915 B1 | 7/2004 | Metzger et al. | |
| 6,785,232 B1 | 8/2004 | Kotser et al. | |
| 6,813,268 B1 | 11/2004 | Kalkunte et al. | |
| 6,888,806 B1 | 5/2005 | Miller et al. | |
| 6,891,835 B2 | 5/2005 | Kalkunte et al. | |
| 6,892,309 B2 | 5/2005 | Richmond et al. | |
| 6,920,109 B2 | 7/2005 | Yazaki et al. | |
| 6,940,861 B2 | 9/2005 | Liu et al. | |
| 7,139,267 B2 | 11/2006 | Lu et al. | |
| 7,236,491 B2 | 6/2007 | Tsao et al. | |
| 7,353,259 B1 | 4/2008 | Bakke et al. | |
| 7,421,478 B1 | 9/2008 | Muchow | |
| 7,451,221 B2 | 11/2008 | Basani et al. | |
| 7,606,867 B1 | 10/2009 | Singhal et al. | |
| 7,627,672 B2 | 12/2009 | Lai et al. | |
| 7,660,824 B2 | 2/2010 | Halpern et al. | |
| 7,673,008 B2 | 3/2010 | Kojima | |
| 7,738,504 B1 | 6/2010 | Deaner et al. | |
| 7,849,178 B2 | 12/2010 | Shen et al. | |
| 7,949,893 B1 | 5/2011 | Knaus et al. | |
| 8,122,289 B2* | 2/2012 | Sargor | G06F 9/5083 714/13 |
| 8,266,235 B2 | 9/2012 | Jalan et al. | |
| 8,612,612 B1* | 12/2013 | Dukes | H04L 67/14 370/230 |
| 8,849,938 B2 | 9/2014 | Jalan et al. | |
| 8,897,154 B2* | 11/2014 | Jalan | H04L 67/2819 370/252 |
| 9,154,577 B2 | 10/2015 | Jalan et al. | |
| 9,477,563 B2 | 10/2016 | Jalan et al. | |
| 9,596,134 B2 | 3/2017 | Jalan et al. | |
| 2001/0043564 A1 | 11/2001 | Bloch et al. | |
| 2002/0012348 A1 | 1/2002 | Mizuhara et al. | |
| 2002/0071387 A1 | 6/2002 | Horiguchi et al. | |
| 2002/0075875 A1 | 6/2002 | Dravida et al. | |
| 2002/0131413 A1 | 9/2002 | Tsao et al. | |
| 2003/0023898 A1 | 1/2003 | Jacobs et al. | |
| 2003/0133406 A1 | 7/2003 | Fawaz et al. | |
| 2003/0140132 A1 | 7/2003 | Champagne et al. | |
| 2003/0158886 A1 | 8/2003 | Walls et al. | |
| 2003/0169734 A1 | 9/2003 | Lu et al. | |
| 2003/0189947 A1 | 10/2003 | Beshai | |
| 2004/0024831 A1 | 2/2004 | Yang et al. | |
| 2004/0059813 A1 | 3/2004 | Bolder et al. | |
| 2004/0228274 A1 | 11/2004 | Yazaki et al. | |
| 2004/0246980 A1 | 12/2004 | Balakrishnan | |
| 2004/0264481 A1 | 12/2004 | Darling et al. | |
| 2004/0268358 A1* | 12/2004 | Darling | H04L 29/06 718/105 |
| 2005/0163049 A1 | 7/2005 | Yazaki et al. | |
| 2005/0243856 A1 | 11/2005 | Mishra et al. | |
| 2006/0031506 A1 | 2/2006 | Redgate | |
| 2006/0101372 A1 | 5/2006 | Zhuo et al. | |
| 2006/0104230 A1 | 5/2006 | Gidwani | |
| 2006/0123479 A1 | 6/2006 | Kumar et al. | |
| 2006/0164987 A1 | 7/2006 | Ruiz Floriach et al. | |
| 2006/0206594 A1 | 9/2006 | Brown et al. | |
| 2007/0081527 A1 | 4/2007 | Betker et al. | |
| 2007/0086428 A1 | 4/2007 | Lai et al. | |
| 2008/0104215 A1 | 5/2008 | Excoffier et al. | |
| 2009/0204699 A1 | 8/2009 | Kortright | |
| 2010/0049836 A1 | 2/2010 | Kramer | |
| 2010/0094967 A1* | 4/2010 | Zuckerman | H04L 67/1002 709/219 |
| 2010/0162036 A1 | 6/2010 | Linden et al. | |
| 2011/0066672 A1 | 3/2011 | Zamarreno et al. | |
| 2011/0161405 A1 | 6/2011 | He | |
| 2012/0179770 A1 | 7/2012 | Jalan et al. | |
| 2012/0281540 A1 | 11/2012 | Khan et al. | |
| 2012/0297240 A1 | 11/2012 | Jalan et al. | |
| 2012/0311116 A1 | 12/2012 | Jalan et al. | |
| 2013/0151686 A1 | 6/2013 | Takaoka et al. | |
| 2015/0039674 A1* | 2/2015 | Agarwal | H04L 67/2842 709/203 |
| 2015/0195182 A1* | 7/2015 | Mathur | H04L 43/50 714/27 |
| 2016/0020947 A1 | 1/2016 | Jalan et al. | |
| 2016/0062855 A1 | 3/2016 | Jalan et al. | |
| 2017/0013051 A1 | 1/2017 | Jalan et al. | |

FOREIGN PATENT DOCUMENTS

| | | |
|---|---|---|
| CN | 101252506 A | 8/2008 |
| CN | 101519078 A | 9/2009 |
| CN | 102708004 | 10/2012 |
| CN | 102984194 | 3/2013 |
| EP | 2663919 | 11/2013 |
| HK | 1183571 | 12/2013 |
| HK | 1186802 | 3/2014 |
| JP | 5948345 B2 | 9/2002 |
| JP | 2002278787 A | 9/2002 |
| JP | H06044090 A | 9/2002 |
| JP | 2003345640 A | 12/2003 |
| JP | 2007257023 A | 10/2007 |
| JP | 2009003923 A | 1/2009 |
| TW | NI182936 | 7/2003 |
| TW | I277324 | 3/2007 |
| TW | I233734 | 6/2015 |
| WO | 2010077222 | 7/2010 |
| WO | 2012097015 | 7/2012 |
| WO | 2012170226 | 12/2012 |
| WO | WO2015164027 A1 | 10/2015 |

OTHER PUBLICATIONS

Bennett et al., "WF²Q: Worst-case fair weighted fair queueing," Proc. IEEE INFOCOM '96, pp. 120-128 San Francisco, CA, Mar. 1996.

Golestani, S.J., "A self-clocked fair queueing scheme for broadband applications," Proc. INFOCOM '94, pp. 636-646, Jun. 1994.

Zhang, L. "Virtual Clock: A new traffic control algorithm for packet-switched networks," ACM Trans. on Computer Systems, vol. 9, No. 2, pp. 101-124, May 1991.

Shreedhar et al., "Efficient fair queuing using deficit round-robin," IEEE/ACM Trans. Networking, vol. 4, No. 3, pp. 375-385, Jun. 1996.

Stiliadis et al., "Efficient fair queueing algorithms for packet-switched networks," IEEE/ACM Trans. Networking, vol. 6, No. 2, pp. 175-185, Apr. 1998.

Suri et al., "Leap forward virtual clock: a new fair queuing scheme with guaranteed delays and throughput fairness," Proc. INFOCOM '97, pp. 557-565, Apr. 1997.

Stiliadis et al., "Latency-rate servers: a general model for analysis of traffic scheduling algorithms," IEEE/ACM Trans. Networking, vol. 6, No. 5, pp. 611-624, Oct. 1998.

Matsufuru et al. "Efficient fair queueing for ATM networks using uniform round robin," Proc. INFOCOM '99, pp. 389-397, Mar. 1999.

Katevenis et al., "Weighted round-robin cell mutliplexing in a general-purpose ATM switch chip," IEEE Journal on Selected Areas in Communication, vol. 9, No. 8, pp. 1265-1279, Oct. 1991.

Chaskar et al., "Fair scheduling with tunable latency: A Round Robin approach," IEEE Globecom '99, pp. 1328-1333, Dec. 1999.

(56) References Cited

OTHER PUBLICATIONS

Bennett et al., "High speed, scalable, and accurate implementation of packet fair queueing algorithms in ATM networks," Proc. ICNP '97, pp. 7-14, Oct. 1997.

Nageshwara Rao et al., "Concurrent access of priority queues," IEEE Trans. on Computers, vol. 37, No. 12, pp. 1657-1665, Dec. 1998.

Rexford et al., "Hardware-efficient fair queueing architectures for high-speed networks," Proc. INFOCOM '96, pp. 638-646, Mar. 1996.

* cited by examiner

DISTRIBUTED HIGH AVAILABILITY PROCESSING METHODS FOR SERVICE SESSIONS

TECHNICAL FIELD

This disclosure relates generally to data processing and, more particularly, to service networks with separate high availability processing for client service sessions and server service sessions.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Network servicing nodes such as server load balancers, application delivery controllers, or traffic managers can facilitate service sessions between a plurality of client devices and a plurality of servers. These servicing nodes can typically balance loads among servers servicing Web documents, voice calls, advertisements, enterprise applications, video streaming services, file transfers, gaming, or any broadband services. In a typical deployment scenario, a client service session terminates in a servicing node that can relay the client service session data to an intended service using a server service session. The servicing node can usually provide additional processing based on service and security policies while relaying the data between the client and the server.

Additionally, in a typical service deployment scenario, the servicing node can choose an Internet Protocol (IP) address to establish the server service session as different from the client network IP address. Thus, the servicing node can use network address translation (NAT) between the client session and the server session. The servicing node can typically be associated with a dedicated NAT address such that a network operator can configure a server side communication channel between the servicing node and the server to forward server session packets to the servicing node efficiently.

The number of clients, servers, services, and active service sessions has been continuously increasing. With the ever increasing demand, networks are expected to keep services available and active service session uninterrupted even when partial network failures are occurring. In order to provide high availability, deployment of dedicated standby servicing nodes has been utilized. However, deployment of idling dedicated standby servicing nodes is not very efficient use of resources. It can be more efficient to provide high availability by distributing service session functionality among a plurality of non-dedicated servicing nodes.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for distributing service sessions in services data networks. Specifically, a method for processing a data packet associated with a service session can comprise receiving, by a forwarding node, the data packet directed to a first servicing node. The method can further include determining, by the forwarding node, that the first servicing node is unavailable. The method can include selecting, based on the determining, a second servicing node from a plurality of servicing nodes. The selecting can be based on a high availability (HA) policy. The method can further include sending the data packet to the second servicing node.

According to another approach of the present disclosure, there is provided a system for processing a data packet associated with a service session. The system can comprise a forwarding node and a plurality of servicing nodes. The forwarding node can be operable to receive the data packet directed to a first servicing node. The forwarding node can be further operable to determine that the first servicing node is unavailable. Based on the determining, the forwarding node can be operable to select a second servicing node from a plurality of servicing nodes. The selection can be based on a HA policy. The forwarding node can be further operable to send the data packet to the second servicing node. The system can further comprise a plurality of servicing nodes. In some embodiments, the plurality of servicing nodes can include the first servicing node and the second servicing node.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
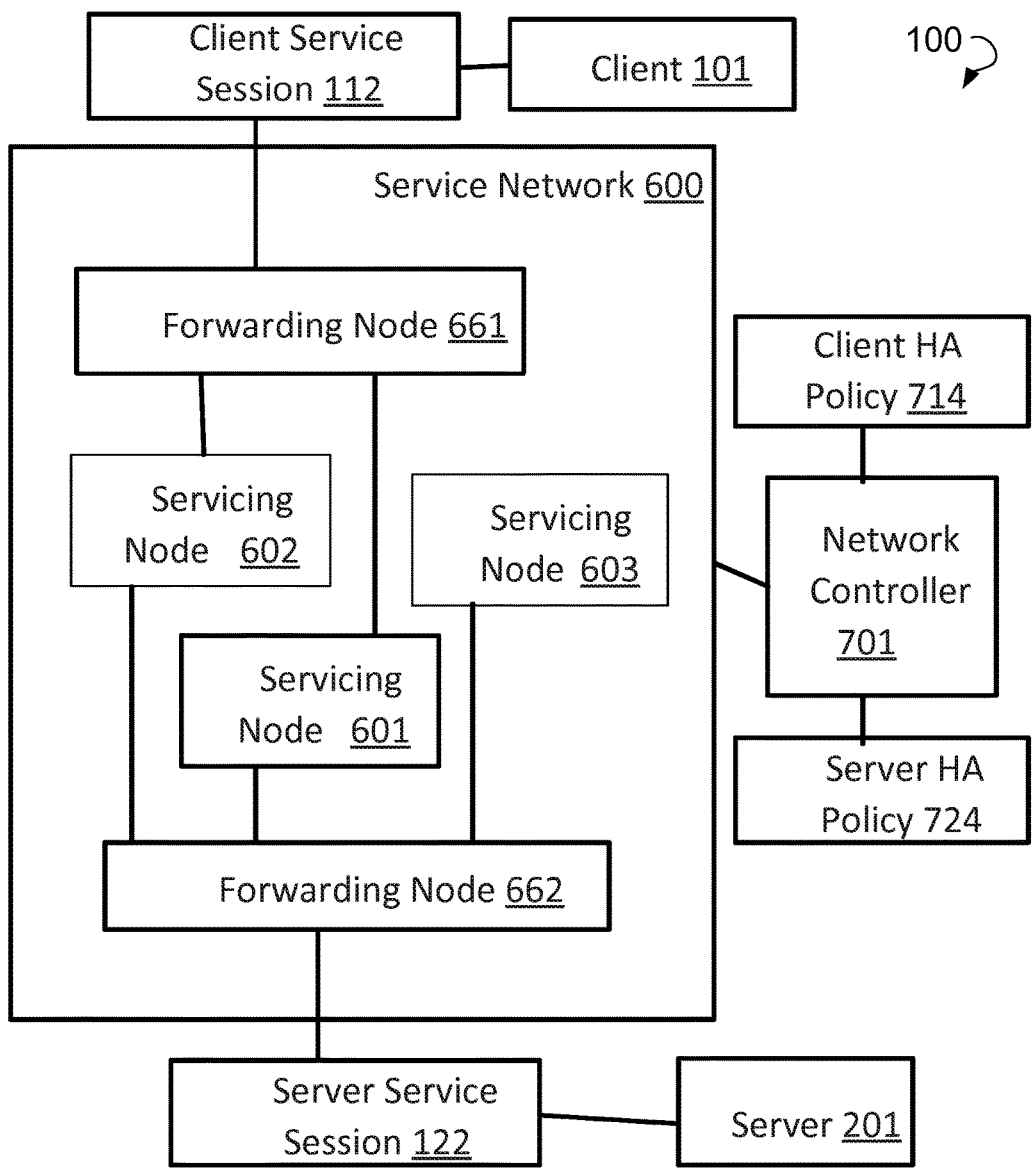
FIG. 1 is a block diagram showing a service data network providing high availability for handling a service session between a client and a server.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein can be implemented in software executing on a computer system or in hardware utilizing either a combination of microprocessors or other specially designed application-specific integrated circuits (ASICs), programmable logic devices, or various combinations thereof. In particular, the methods described herein can be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

The present disclosure relates to methods and systems for providing high availability processing of service sessions by distribution the service sessions among multiple servicing nodes. The processing can include decoupling of client service sessions and server service sessions. The methods and systems can allow a more efficient use of servicing node resources within a network while providing a more effective availability of services to the clients.

According to some methods of the current disclosure, a client can conduct a data service session with a server through a servicing node. More specifically, the client can send data packets associated with a client service session to the servicing node. A forwarding node associated with the client can receive the data packets of the client service session and forward the data packets to the servicing node. When the servicing node receives the data packets of the client service session, the servicing node can process and modify the data packets of the client service session and send the modified data packets to the server.

Additionally, the server can send data packets of a server service session to the servicing node. A forwarding node associated with the server can receive the data packets of the server service session and send the data packets to the servicing node. The servicing node can be operable to receive, process, and modify the data packets of the server service session and send the modified data packets to the client.

If the servicing node becomes unavailable, a first standby servicing node and a second standby servicing node can begin servicing the client service session and the server service session and providing high availability services to the client and the server. According to an example method, a network controller can send a client HA policy to the servicing node and the first standby servicing node. When the servicing node becomes unavailable, the first standby servicing node can take over the processing of the data packets of the client service session, as well as the processing of the data packets of the server service session received from the second standby servicing node associated with the server. In particular, the forwarding node associated with the client can send the data packets of the client service session to the first standby servicing node. The first standby servicing node can receive the data packets of the client service session and redirect the data packets of the client service session to the second standby servicing node associated with the server.

Furthermore, the network controller can send a server HA policy to the servicing node and the second standby servicing node. After the servicing node becomes unavailable, the second standby servicing node can take over processing the data packets of the server service session, as well as processing of the data packets of the client service session received from the first standby servicing node. In particular, the forwarding node associated with the server can send the data packets of the server service session to the second standby servicing node. The second standby servicing node can receive the data packets of the server service session and redirect the data packets of the server service session to the first standby servicing node.

Referring now to the drawings, FIG. 1 is a block diagram showing a data network 100 handling a service session between a client device and a server device, according to an example embodiment. In an embodiment, a client device shown as client 101 conducts a data service session with a server device shown as server 201 through servicing node 601 of a service network 600. The service session between client 101 and server 201 can include a client service session 112, between client 101 and servicing node 601, and a server service session 122, between servicing node 601 and server 201. In one embodiment, client 101 sends data packets of client service session 112 to servicing node 601. In one embodiment, forwarding node 661 of service network 600 receives the data packets of client service session 112 and forwards the data packets to servicing node 601. When servicing node 601 receives the data packets of client service session 112, servicing node 601 processes and modifies the data packets of client service session 112 and sends the modified data packets to server 201. The processing and modifications of the data packets of client service session 112 are described in detail with reference to FIG. 3.

In one embodiment, client device shown as client 101 can include a personal computer, a laptop, a smartphone, a cell phone, a tablet, a personal digital assistant (PDA), a desktop, a notebook, a set top box, a network connected device, a computer, a network connecting computing device, a network element such as an Ethernet switch, a router, or any network computing device seeking a service from a server.

In one embodiment, service network 600 connects to one server 201. Server 201 may be a Web server, a video server, a music server, an e-commerce server, an enterprise application server, a news server, a mobile broadband service server, a messaging server, an email server, a game server, an app server, an Internet radio server, a storage server, a social network services server, or a network computing device providing services to a service session from client 101. The service session may be a Web page access session, an e-commerce transaction session, a video playing session, a music playing session, a file transfer session, an image downloading session, a message chat session, a session to send a message, a picture, a video, a file, a game playing session, or any data communication session between client 101 and server 201.

In one embodiment, service network 600 includes an Ethernet network, an Asynchronous Transfer Mode (ATM) network, a cellular network, a wireless network, a Frame Relay network, an optical network, an IP network, or data network utilizing other physical layer, link layer capability or network layer to carry data packets. In one embodiment, service network 600 connects to network controller 701, which communicates to one or more network nodes in service network 600.

In one embodiment, forwarding node 661 or forwarding node 662 may include an Ethernet switch, a network switch, a router, a link aggregator, or a network device forwarding data packets from a network interface to another network interface included in the network device.

In one embodiment, server 201 sends the data packets of server service session 122 to servicing node 601 through service network 600. In one embodiment, forwarding node 662 of service network 600 receives the data packets of server service session 122 and sends the data packets to servicing node 601. Servicing node 601 can receive, process, and modify the data packets of server service session 122 and send the modified data packets to client 101. The processing and modification of the data packets of server service session 122 are described in detail with reference to FIG. 4.

In one embodiment, servicing node 601 becomes unavailable. Servicing node 601 may be unavailable due to failure, maintenance shutdown, or disconnection from forwarding node 661 or forwarding node 662. Servicing node 602 and servicing node 603 participate to service client service session 112 and server service session 122 to provide high availability services to client 101 and server 201. In one embodiment, network controller 701 sends client HA policy 714 to servicing node 601 and servicing node 602. When servicing node 601 fails, servicing node 602 takes over processing of the data packets of client service session 112 and the data packets of server service session 122. In one embodiment, forwarding node 661 recognizes failure of servicing node 601 and sends the data packets of client service session 112 to servicing node 602. Servicing node 602 receives the data packets of client service session 112, processes and modifies the received data packets, and sends the modified data packets to server 201.

In one embodiment, network controller 701 sends server HA policy 724 to servicing node 601 and servicing node 603. After servicing node 601 fails, forwarding node 662 sends the data packets of server service session 122 to servicing node 603. Servicing node 603 receives the data packets of server service session 122 and redirects the data packets of server service session 122 to servicing node 602. In one embodiment, servicing node 603 receives an indication from network controller 701 about servicing node 602, or an indication from servicing node 602 so as to redirect the data packets of server service session 122 to servicing node 602. In one embodiment, servicing node 603 receives client HA policy 714 to determine servicing node 602 for the data packet redirect.

In one embodiment, servicing node 602 receives the data packets of server service session 122 from servicing node 603, processes and modifies the data packets of server service session 122, and sends the modified data packets to client 101.

Figure 2:
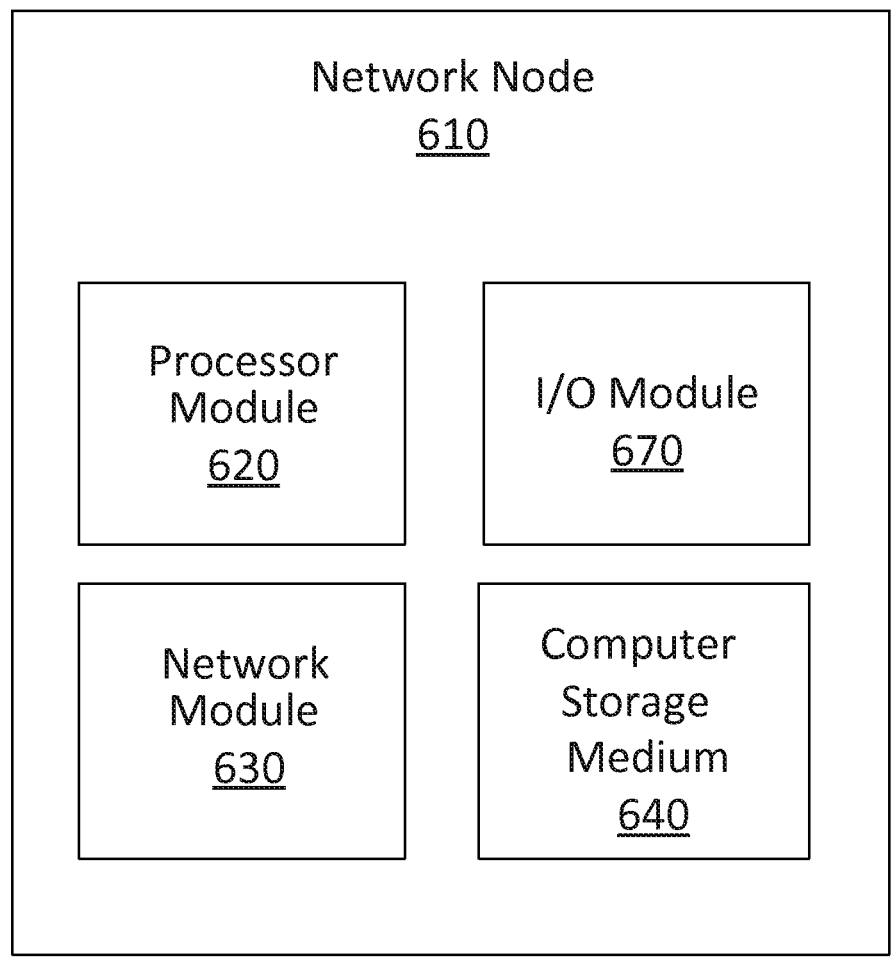
FIG. 2 is a block diagram showing components of a network node.

FIG. 2 illustrates a network node 610, such as a servicing node or a network controller, according to an example embodiment. Network node 610 includes a processor module 620, a network module 630, and a computer storage medium 640. In one embodiment, processor module 620 includes one or more processors which may be a microprocessor, an Intel processor, an AMD processor, a MIPS processor, an ARM-based processor, or a RISC processor. In one embodiment, processor module 620 includes one or more processor cores embedded in a processor. In one embodiment, processor module 620 includes one or more embedded processors, or embedded processing elements in a Field Programmable Gate Array (FPGA), an ASIC) or Digital Signal Processor (DSP).

In one embodiment, network module 630 includes a network interface such as Ethernet, optical network interface, a wireless network interface, T1/T3 interface, or a WAN or LAN interface. In one embodiment, network module 630 includes a network processor. In one embodiment, storage module 640 includes RAM, DRAM, SRAM, SDRAM, or memory utilized by processor module 620 or network module 630.

In one embodiment, storage module 640 stores data utilized by processor module 620. In one embodiment, storage module 640 includes a hard disk drive, a solid state drive, an external disk, a DVD, a CD, or a readable external disk. Storage module 640 stores one or more computer programming instructions which when executed by processor module 620 or network module 630 implement one or more of the functionalities of the present disclosure.

In one embodiment, network node 610 further includes an input/output (I/O) module 670, which may include a keyboard, a keypad, a mouse, a gesture based input sensor, a microphone, a physical or sensory input peripheral, a display, a speaker, or a physical or sensual output peripheral.

Figure 3:
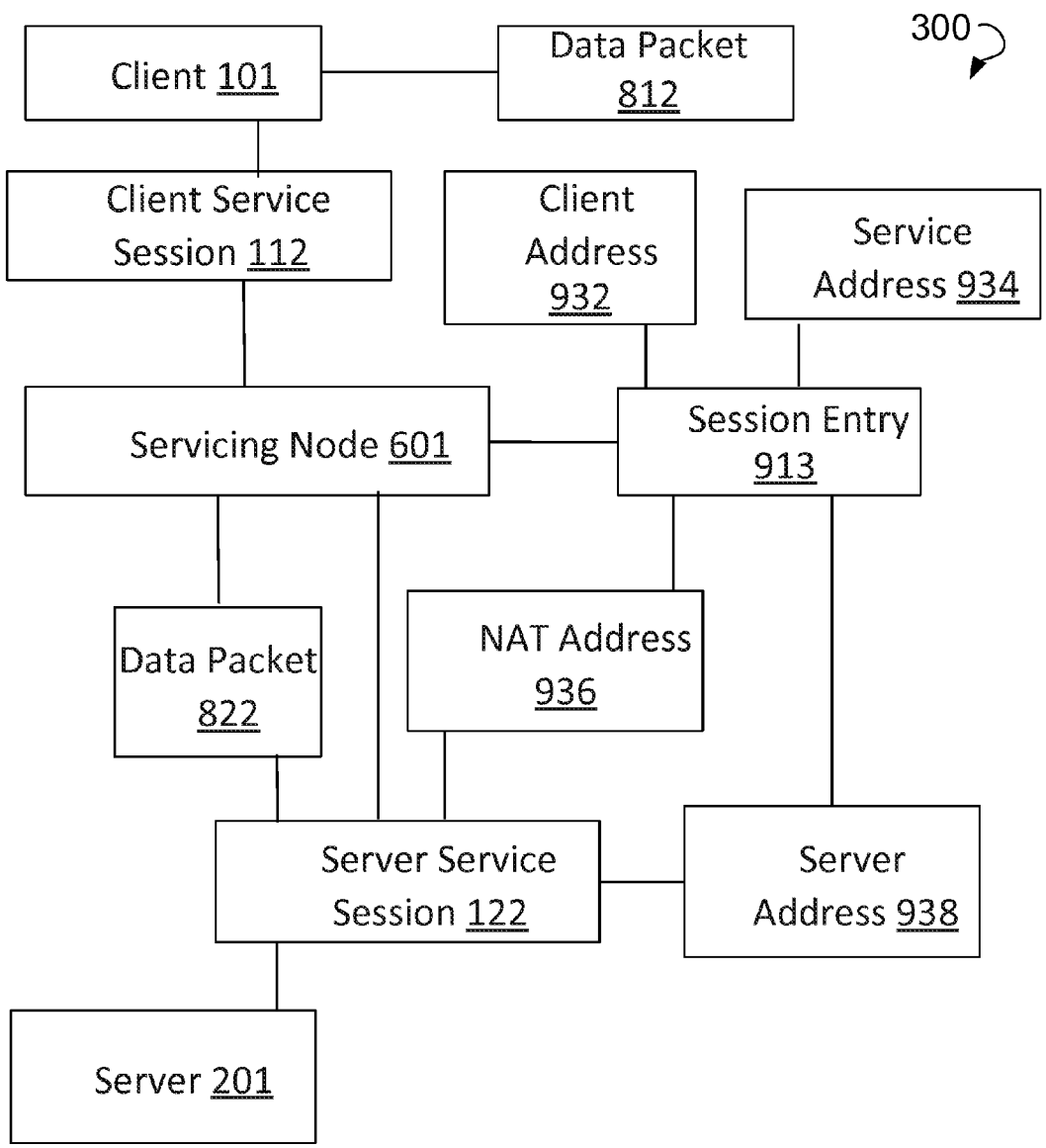
FIG. 3 is a block diagram showing a servicing node processing a client service session.

FIG. 3 is a block diagram 300 showing servicing node 601 processing client service session 112, according to an example embodiment. In one embodiment, client 101 sends data packet 812 of client service session 112 to servicing node 601. In one embodiment, data packet 812 is a service request for a service. Servicing node 601 processes the service request of data packet 812 and selects server 201 to serve client service session 112. In one embodiment, servicing node 601 creates a session entry 913 to associate to client service session 112. Servicing node 601 associates further a NAT address 936 with session entry 913. Servicing node 601 uses NAT address 936 and a server network address 938 to establish server service session 122 with server 201.

In one embodiment, data packet 812 is a service data packet that client 101 sends to server 201 through servicing node 601. Upon receiving data packet 812, servicing node 601 processes data packet 812 according to a network application in servicing node 601. In one embodiment, servicing node 601 generates data packet 822 based on data packet 812 and sends data packet 822 to server 201. In one embodiment, servicing node 601 uses NAT address 936 as the source network address for data packet 822, and server address 938 as the destination network address for data packet 822.

Embodiments of a network application in servicing node 601 include one or more of security detection, content inspection, deep packet inspection, application proxy, legal interception, accounting and billing, content caching, virus detection, intrusion detection and prevention, bandwidth management, traffic management, service policy processing based on company policy, government policy, or service provider policy, server load balancing, network optimization, data de-duplication, access control, or any third party network application requested by a network computer. In one embodiment, the network application is processed by the processor module of servicing node 601.

In one embodiment, servicing node 601 extracts client address 932 from data packet 812 and service address 934 from data packet 812, and stores client address 932 and service address 934 in session entry 913. In one embodiment, client address 932 is a network address of client 101, and servicing node 601 extracts client address 932 from the source network address of data packet 812. In one embodiment, service address 934 is obtained from the destination network address of data packet 812. In one embodiment, service address 934 is obtained from a service policy stored in servicing node 601.

Figure 4:
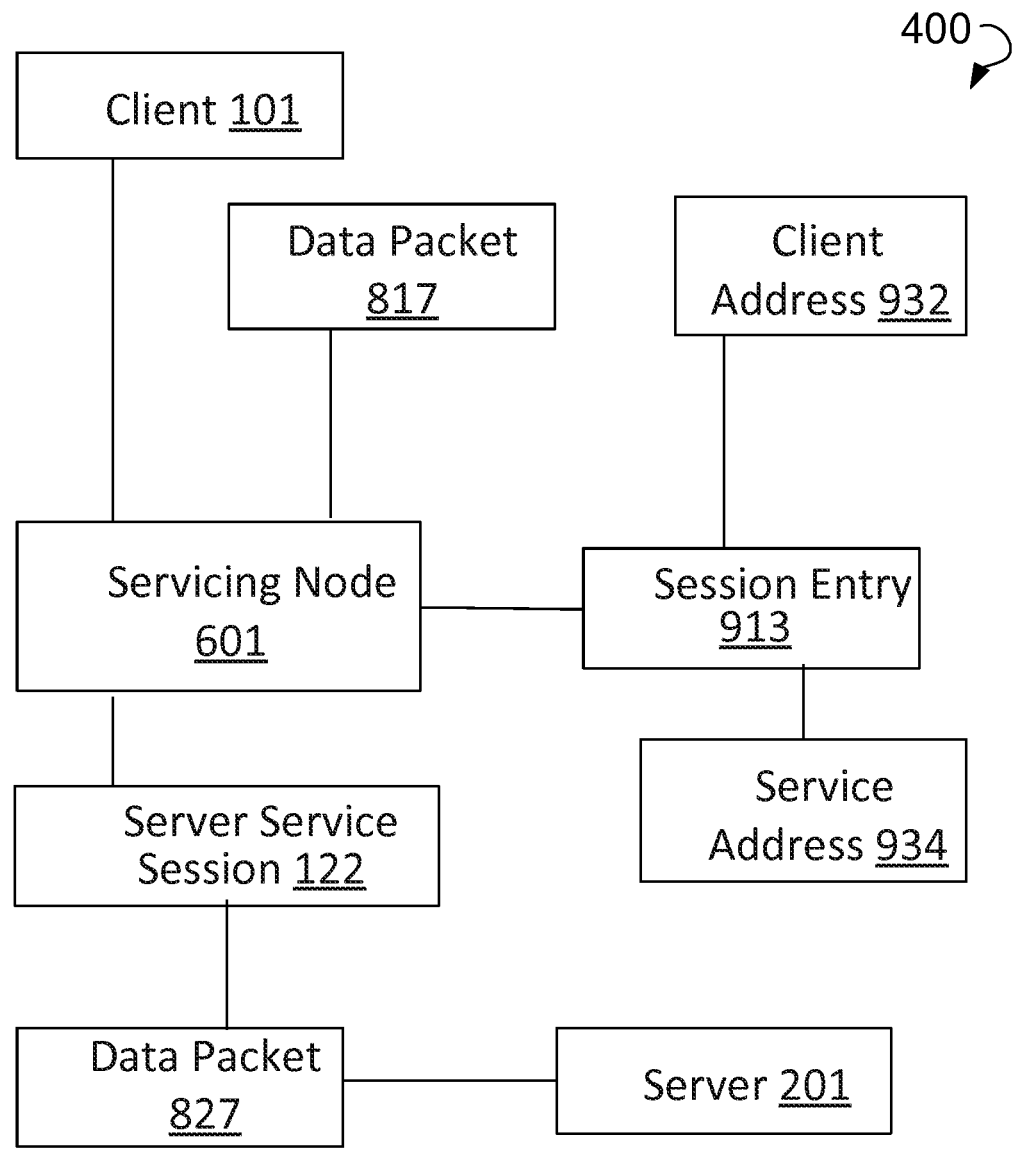
FIG. 4 is a block diagram showing a servicing node processing a server service session.

FIG. 4 is a block diagram 400 illustrating servicing node 601 processing server service session 122, according to an example embodiment. In one embodiment, server 201 sends a data packet 827 of server service session 122 to servicing node 601. Servicing node 601 retrieves session entry 913 of server service session 122 and processes data packet 827 based on session entry 913. In one embodiment, servicing node 601 generates data packet 817 based on data packet 827 and session entry 913. In one embodiment, servicing address 601 uses client address 932 retrieved from session entry 913 as the destination network address of data packet 817, and service address 934 retrieved from session entry 913 as the source network address of data packet 817. Servicing node 601 sends data packet 817 to client 101.

In one embodiment, a network address illustrated in FIG. 3 and FIG. 4 includes one or more of an IP address, a TCP or a UDP port number, a link layer address, a VLAN identity, a network tunnel identity, a transport layer address, and an application layer address.

Figure 5:
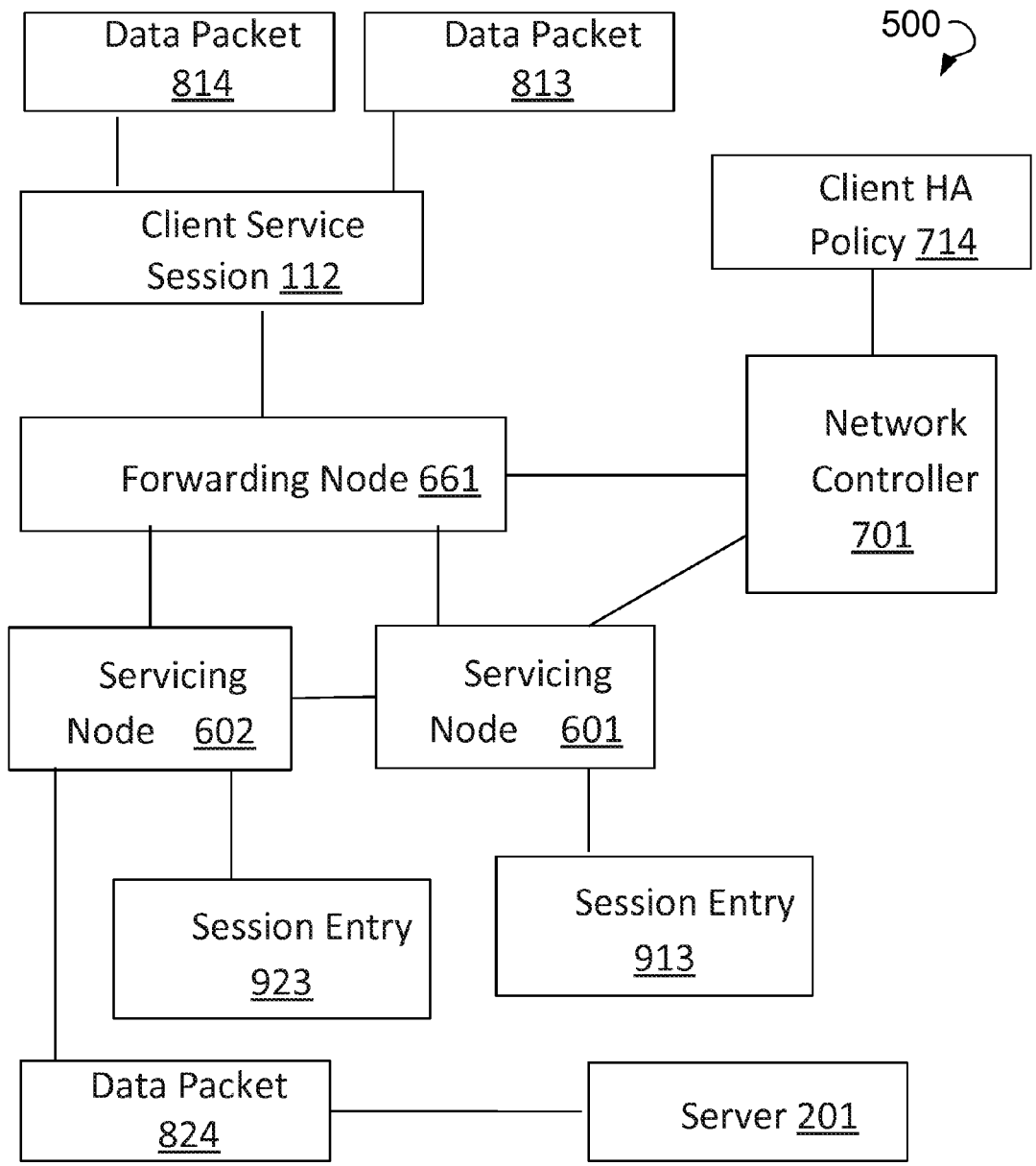
FIG. 5 is a block diagram showing applying high availability to a client service session.

FIG. 5 is a block diagram 500 illustrating providing high availability to a client service session 112, according to an example embodiment. In one embodiment, servicing node 601 receives from network controller 701 a client HA policy 714 which indicates that servicing node 602 is to act as a standby servicing node for servicing node 601. In one embodiment, servicing node 601 creates session entry 913 based on a data packet 813 of client service session 112. Servicing node 601 sends information of session entry 913 to servicing node 602. Servicing node 602 creates session entry 923 according to session entry 913 information. In one embodiment, servicing node 601 updates session entry 913 after processing data packet 813. Servicing node 601 sends updated session entry 913 to servicing node 602 and servicing node 602 updates session entry 923 according to the received session entry 913 update information.

In one embodiment, servicing node 601 becomes unavailable. Servicing node 601 may be unavailable due to failure, maintenance shutdown, or disconnection from forwarding node 661. Servicing node 602 takes over the processing of client service session 112. In one embodiment, forwarding node 661 recognizes unavailability of servicing node 601 and forwards a received data packet 814 of client service session 112 to servicing node 602. In one embodiment, network controller 701 informs forwarding node 661 of the unavailability of servicing node 601, or that forwarding of client service session 112 to servicing node 602 is necessary. In one embodiment, servicing node 602 informs forwarding node 661 to send client the data packets of service session 112 to servicing node 602. In one embodiment, servicing node 601 informs forwarding node 661 that it is becoming unavailable. In one embodiment, forwarding node 661 monitors availability of servicing node 601 and detects servicing node 601 becoming unavailable.

In one embodiment, servicing node 602 receives data packet 814, matches and retrieves session entry 923, processes data packet 814, creates a new data packet 824 based on data packet 814 and session entry 923, and sends data packet 824 to server 201. In one embodiment, the processing of servicing node 602 applicable to data packet 814 is similar to what servicing node 601 would apply to data packet 814 if servicing node 601 was available.

Figure 6:
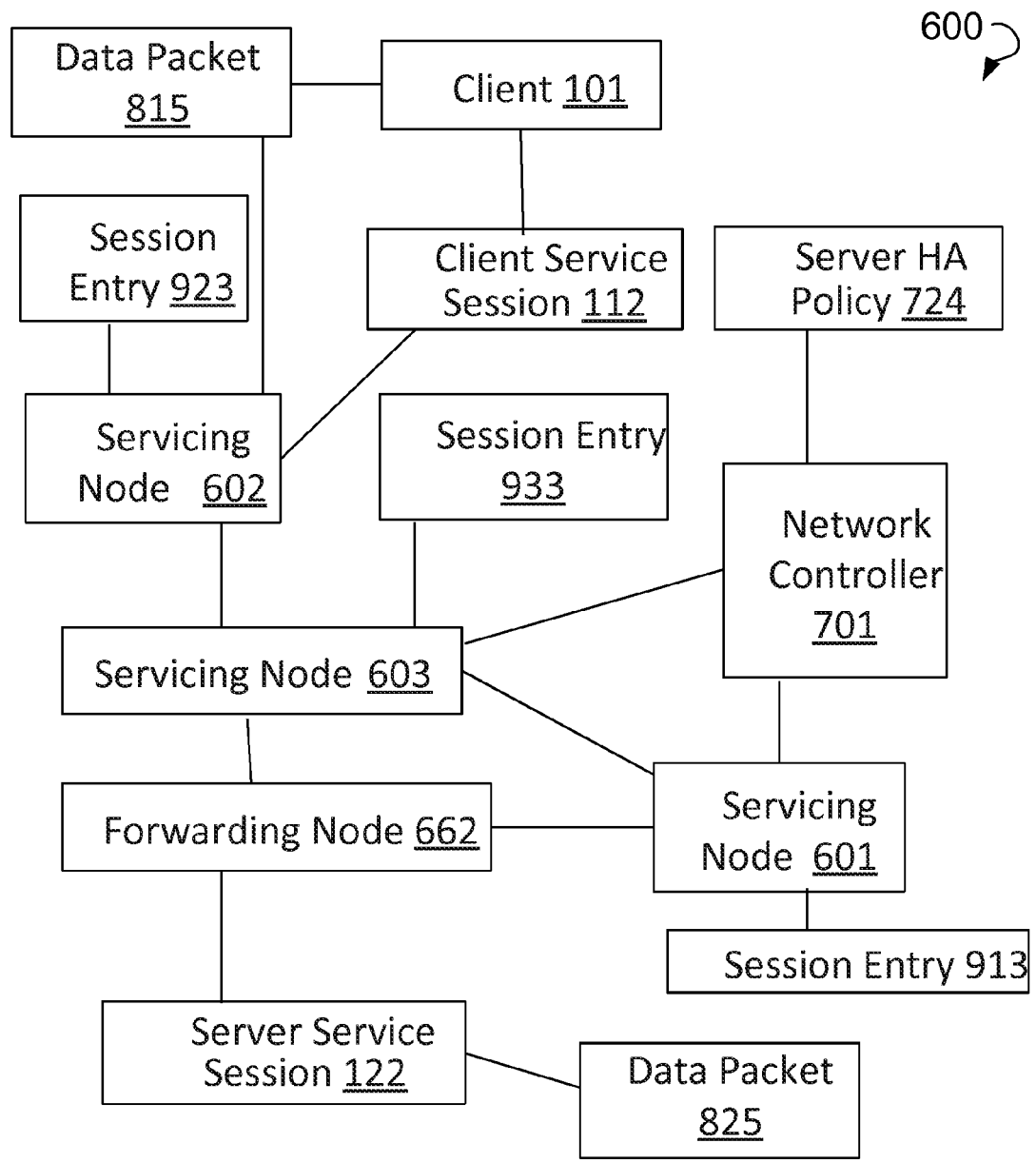
FIG. 6 is a block diagram showing applying high availability to a server service session.

FIG. 6 is a block diagram 600 illustrating an exemplary embodiment of high availability processing for a server service session. In one embodiment, network controller 701 includes server HA policy 724, which includes servicing node 601 acting as an active servicing node for the policy and servicing node 603 acting as a standby servicing node. In one embodiment, server HA policy 724 includes a classification, which may be a NAT IP address or a server IP address.

In one embodiment, servicing node 601 receives from network controller 701 server HA policy 724. Servicing node 601 matches the server HA policy 724 classification against session entry 913 and determines that session entry 913 matches either the NAT IP address or the server IP address of classification of server HA policy 724. In one embodiment, servicing node 601 sends information of session entry 913 to servicing node 603. Servicing node 603 creates session entry 933 based on session entry 913. In one embodiment, servicing node 601 further sends an indication of servicing node 602 associated to session entry 913 to servicing node 603. Servicing node 603 associates session entry 933 with servicing node 602. In one embodiment, session entry 913 includes an indication to servicing node 602, and servicing node 603 associates session entry 933 with servicing node 602. In one embodiment, session entry 933 includes a NAT address or server address of session entry 913 as illustrated in FIG. 3.

In one embodiment, servicing node 603 receives server HA policy 724, either from network controller 701 or from servicing node 601. Servicing node 603 creates session entry 933 and stores the classification of server HA policy 724 in session entry 933. In one embodiment, server HA policy 724 includes an indication to servicing node 602. Service node 603 associates session entry 933 with servicing node 602.

In one embodiment, servicing node 601 becomes unavailable. Forwarding node 662 forwards a subsequent data packet 825 of server service session 122 to servicing node 603. In one embodiment, forwarding node 662 determines servicing node 601 is unavailable and changes a forwarding decision to forward data packets of server service session 122 to servicing node 603. In one embodiment, forwarding node 662 is informed, for example, by servicing node 603 or by network controller 701, to change the forwarding decision. In one embodiment, forwarding node 662 is informed by servicing node 601 to change the forwarding decision.

In one embodiment, servicing node 603 receives data packet 825 of server service session 122. Servicing node 603 extracts one or more network addresses of data packet 825 and matches the extracted network addresses against session entry 933. In one embodiment, servicing node 603 matches the destination network address of data packet 825 against the NAT IP address of session entry 933. In one embodiment, servicing node 603 matches the source network address of data packet 825 against the server address of session entry 933. In one embodiment, servicing node 603 determines there is a match between session entry 933 and data packet 825, and servicing node 603 selects session entry 933 to forward data packet 825 to servicing node 602. In one embodiment, servicing node 603 forwards data packet 825 using forwarding node 662, an IP tunnel between servicing node 603 and servicing node 602, a communication session, a circuit or a direct link between servicing node 603 and servicing node 602.

In one embodiment, servicing node 602 acts as a standing servicing node to client service session 112 for servicing node 601 as illustrated in FIG. 5. In one embodiment, servicing node 602 stores in session entry 923 all necessary information from session entry 913 to process data packet 825 as if data packet 825 is processed by servicing node 601 using session entry 913. Servicing node 602 generates data packet 815 using session entry 923 as if servicing node 601 would generate data packet 815 using session entry 913. Servicing node 602 sends generated data packet 815 to client 101.

In one embodiment, servicing node 601 serves two or more client service sessions corresponding to two or more server service sessions. Servicing node 601 may use a same NAT IP address for the server service sessions.

In one embodiment, servicing node 601 has two or more standby servicing nodes corresponding to the two or more client service sessions. In one embodiment, servicing node 601 has a same standby servicing node for the corresponding two or more server service sessions. When servicing node 601 becomes unavailable, the same standby servicing node forwards data packets of the two or more server service sessions to the corresponding two or more standby servicing nodes, which in turn processes received data packets according to the corresponding two or more client service sessions.

In one embodiment, servicing node 601 has a same standby servicing node for the two or more client service sessions but two or more standby servicing nodes corresponding to the two or more server service sessions. When servicing node 601 becomes unavailable, the two or more standby servicing nodes forward data packets for the corresponding to the two or more server service sessions to the same standby servicing node for corresponding two or more client service sessions. The same standby servicing node processes the received data packets according to the corresponding two or more client service sessions.

In one embodiment, servicing node 601 becomes available after being unavailable, and standby servicing node 602 for client service session 112 sends session entry 923 updates or information to servicing node 601 such that servicing node 601 updates its corresponding session entry 913. Forwarding node 661 subsequently forwards data packets of client service session 112 to servicing node 601. Servicing node 601 processes these data packets according to the updated session entry 913. In one embodiment, forwarding node 662 subsequently forwards data packets of server service session 122 to servicing node 601. Servicing node 601 processes the data packets of server service session 122 according to the updated session entry 913. In one embodiment, servicing node 603 removes session entry 933 after servicing node 601 becomes available again.

Figure 7:
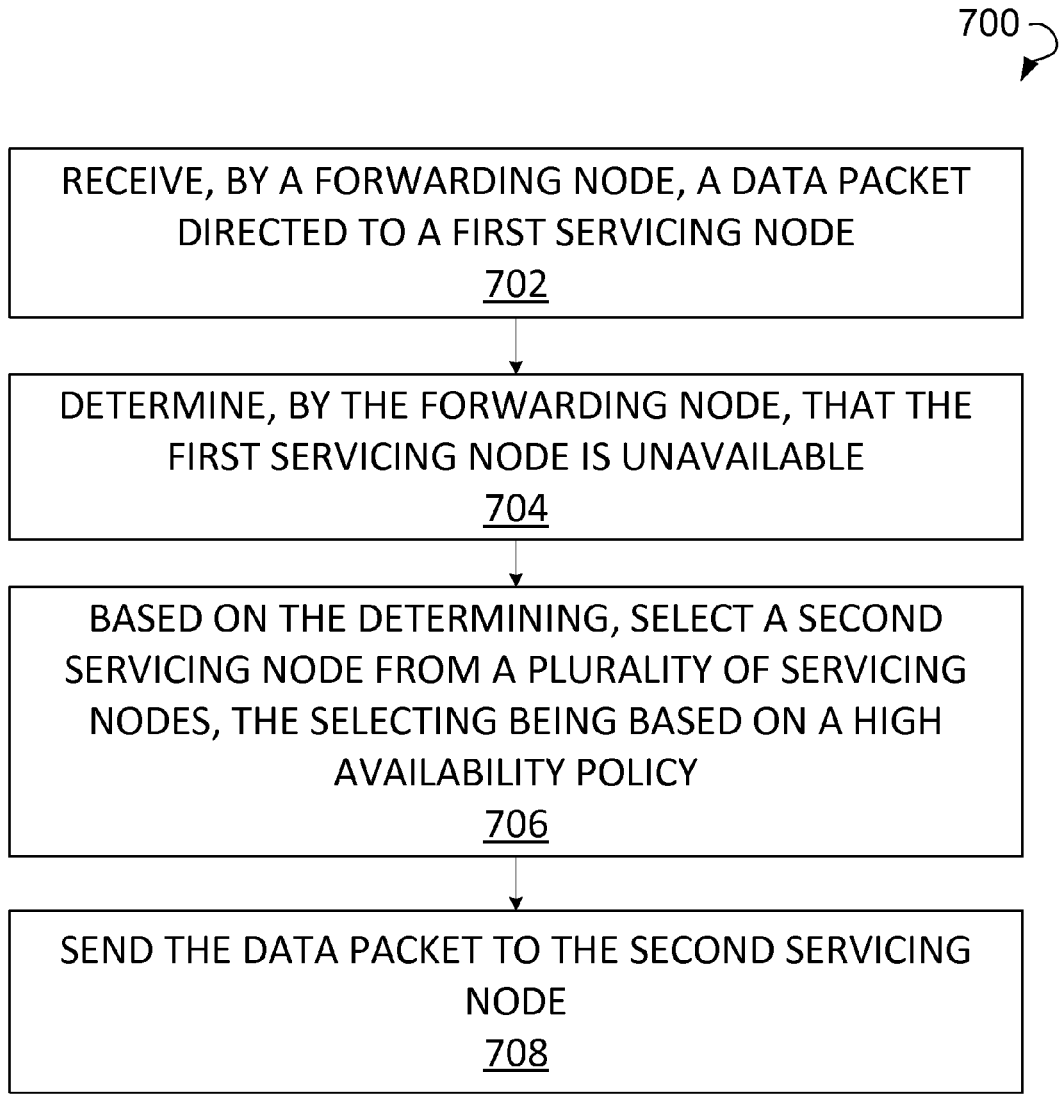
FIG. 7 is a process flow diagram showing a method for processing a data packet associated with a service session.

Referencing now to FIG. 7, steps of a method 700 for processing a data packet associated with a service session, according to an example embodiment. In some embodiments the steps may be combined, performed in parallel, or performed in a different order. The method 700 may also include additional or fewer steps than those illustrated. The steps of the method 700 can be executed by components of a data network shown in FIG. 1-6.

The method 700 can commence with receiving, by a forwarding node, the data packet directed to a first servicing node at operation 702. At operation 704, the forwarding node can determine that the first servicing node is unavailable. In an example embodiment, the determining can be based on a notification from a network controller. The notification can be associated with the unavailability of the first servicing node.

Based on the determining, the forwarding node can select a second servicing node from a plurality of servicing nodes at operation 706. The selecting can be based on a HA policy. In an example embodiment, the HA policy can include one or more of a client HA policy and a server HA policy. In a further example embodiment, the forwarding node can optionally receive an availability indication from the second servicing node. Upon selection of the second servicing node, the data packet can be sent to the second servicing node at operation 708.

In an example embodiment, the method 700 may further comprise receiving the data packet by the second servicing node. Upon receiving the data packet, the second servicing node can determine that the data packet includes a service request. Responsive to the determination, the second servicing node can select a server operable to serve the service session. In an example embodiment, the server can be selected based on a service policy. The service policy may comprise a criterion for selecting the server based, for example, on service address, an address of a client service where the packets of the service session are sent from, and so forth.

Upon selection of the server, the second servicing node can send the data packet to the server. The server can be associated with a server network address. In an example embodiment, sending of the data packet to the server includes sending the data packet to a third servicing node. The third servicing node can be associated with the server.

In a further example embodiment, the second servicing node can create a session entry. The session entry can be associated with the service session. The service session can include a client service session. Upon creation of the service session, the second servicing node can associate the session entry with a NAT address. Based on the NAT address, the second servicing node can establish a further service session. The further service session can include a server service session.

In a further example embodiment, the second servicing node can extract at least one of a client network address and a service address from the data packet. The second servicing node can store the extracted client network address and the service address in the session entry.

In an example embodiment, the method 700 further comprises receiving, by the second servicing node, the data packet from the server. The second servicing node can process the data packet. Thus, a processed data packet can be obtained. The second servicing node can retrieve the client network address from the session entry and send the processed data packet to the client device. The client device can be associated with the client network address.

In a further example embodiment, the first servicing node can receive the HA policy. The HA policy can include an indication to the second servicing node. Based on the received HA policy, the first servicing node can update a session entry. Therefore, an updated session entry can be obtained. The first servicing node can send the updated session entry to the second servicing node.

Figure 8:
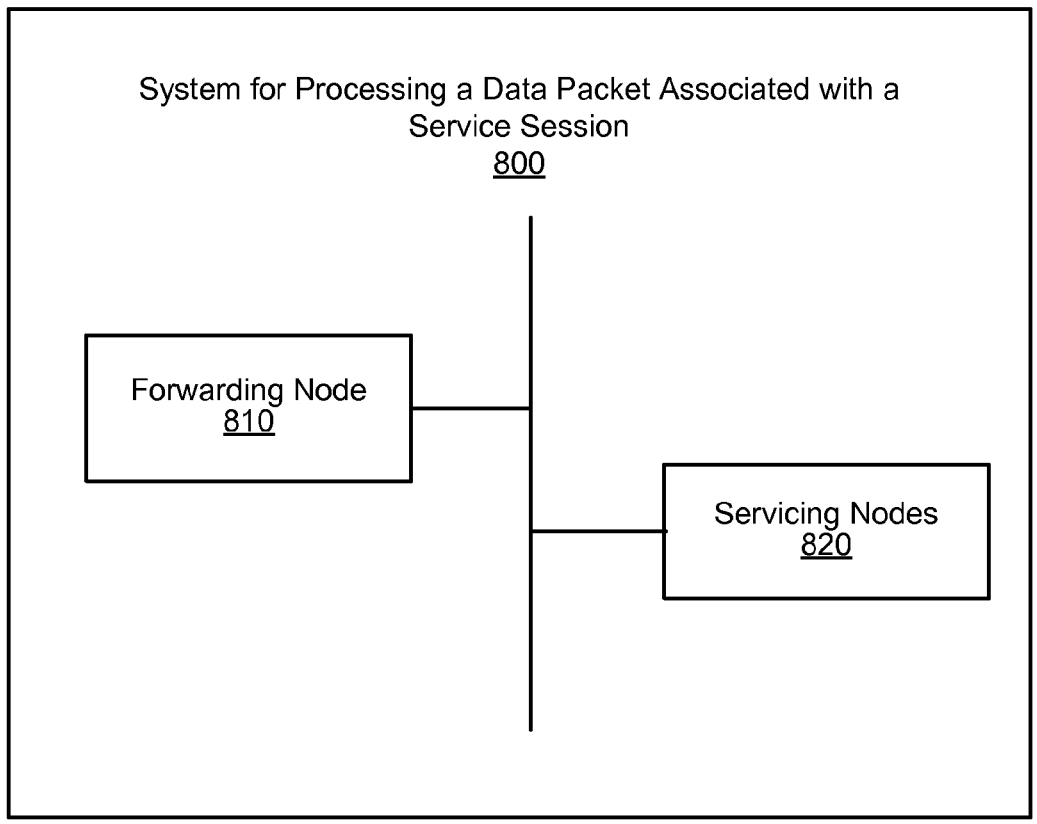
FIG. 8 is block diagram of a system for processing a data packet associated with a service session.

FIG. 8 is a block diagram representing components of a system for processing a data packet associated with a service session, in accordance with certain embodiments. The system 800 can comprise a forwarding node 810 and a plurality of servicing nodes 820. The forwarding node 810 can be operable to receive the data packet directed to a first servicing node. The forwarding node 810 can be further operable to determine that the first servicing node is unavailable. Based on the determining, the forwarding node 810 can be operable to select a second servicing node from a plurality of servicing nodes. The selecting can be based on a HA policy. In an example embodiment, the HA policy includes one or more of a client HA policy and a server HA policy. The forwarding node 810 can be further operable to send the data packet to the second servicing node. In a further example embodiment, the forwarding node 810 can be operable to receive an availability indication from the second servicing node.

The plurality of servicing nodes 820 can include the first servicing node and the second servicing node. In an example embodiment, the second servicing node can be operable to receive the data and determine that the data packet includes a service request. Based on the determining, the second servicing node can be operable to select a server operable to serve the service session. The server can be selected by the second servicing node based on a service policy. The second servicing node can be further operable to send the data packet to the server. The server can be associated with a server network address. In an example embodiment, sending the data packet to the server includes sending the data packet to a third servicing node. The third servicing node can be associated with the server.

In a further example embodiment, the second servicing node can be operable to create a session entry. The session entry can be associated with the service session. The service session can include a client service session. The second servicing node can be operable to associate the session entry with a NAT address. Based on the NAT address, the second servicing node can be operable to establish a further service session. The further service session can include a server service session.

In a further example embodiment, the second servicing node can be operable to extract at least one of a client network address and a service address from the data packet. The second servicing node can store the client network address and the service address in the session entry.

In a further example embodiment, the second servicing node can be operable to receive the data packet from the server. The second servicing node can process the data packet to obtain a processed data packet. The second servicing node can be further operable to retrieve the client network address from the session entry. The second servicing node can send the processed data packet to the client device. The client device can be associated with the client network address.

In a further example embodiment, the first servicing node can be operable to receive the HA policy. The HA policy can include an indication to the second servicing node. The first servicing node can be operable to update a session entry to obtain the updated session entry. Furthermore, the first servicing node can be operable to send the updated session entry to the second servicing node.

Figure 9:
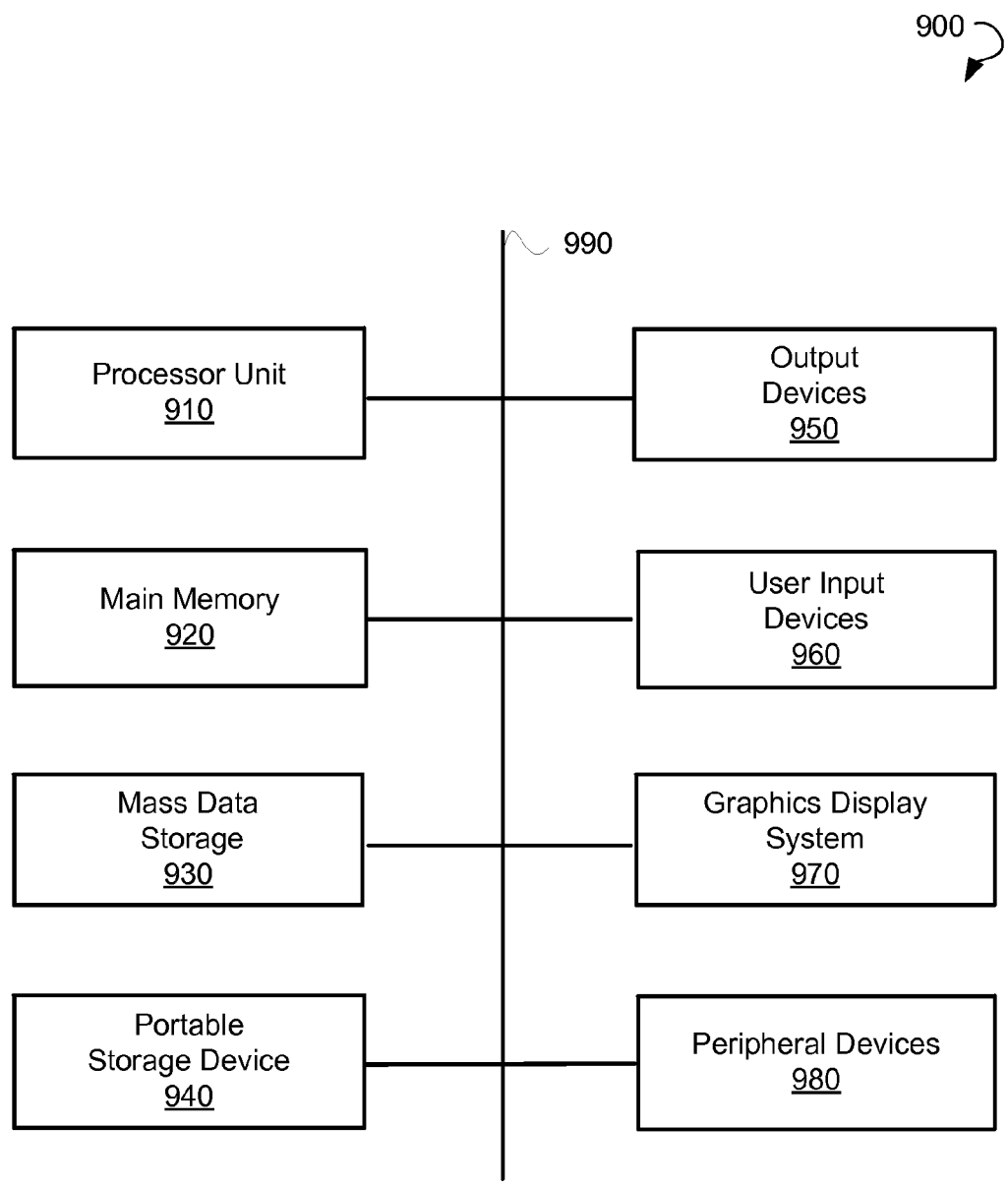
FIG. 9 shows a diagrammatic representation of a computing device for a machine, within which a set of instructions for causing the machine to perform any one or more of the methodologies discussed herein, can be executed.

FIG. 9 illustrates an example computer system 900 that may be used to implement embodiments of the present disclosure. The system 900 of FIG. 9 can be implemented in the contexts of the likes of computing systems, networks, servers, or combinations thereof. The computing system 900 of FIG. 9 includes one or more processor units 910 and main memory 920. Main memory 920 stores, in part, instructions and data for execution by processor 910. Main memory 920 stores the executable code when in operation. The computer system 900 of FIG. 9 further includes a mass data storage 930, portable storage device 940, output devices 950, user input devices 960, a graphics display system 970, and peripheral devices 980. The methods may be implemented in software that is cloud-based.

The components shown in FIG. 9 are depicted as being connected via a single bus 990. The components may be connected through one or more data transport means. Processor unit 910 and main memory 920 are connected via a local microprocessor bus, and the mass data storage 930, peripheral device(s) 980, portable storage device 940, and graphics display system 970 are connected via one or more I/O buses.

Mass data storage 930, which can be implemented with a magnetic disk drive, solid state drive, or an optical disk drive, is a non-volatile storage device for storing data and instructions for use by processor unit 910. Mass data storage 930 stores the system software for implementing embodiments of the present disclosure for purposes of loading that software into main memory 920.

Portable storage device 940 operates in conjunction with a portable non-volatile storage medium, such as a floppy disk, CD, DVD, or Universal Serial Bus (USB) storage device, to input and output data and code to and from the computer system 900 of FIG. 9. The system software for implementing embodiments of the present disclosure is stored on such a portable medium and input to the computer system 900 via the portable storage device 940.

User input devices 960 provide a portion of a user interface. User input devices 960 include one or more microphones; an alphanumeric keypad, such as a keyboard, for inputting alphanumeric and other information; or a pointing device, such as a mouse, a trackball, stylus, or cursor direction keys. User input devices 960 can also include a touchscreen. Additionally, the computer system 900 as shown in FIG. 9 includes output devices 950. Suitable output devices include speakers, printers, network interfaces, and monitors.

Graphics display system 970 includes a liquid crystal display (LCD) or other suitable display device. Graphics display system 970 receives textual and graphical information and processes the information for output to the display device.

Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 of FIG. 9 can be a personal computer (PC), hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, BLU-RAY DISC (BD), any other optical storage medium, RAM, Programmable Read-Only Memory (PROM), Erasable Programmable Read-Only Memory (EPROM), Electronically Erasable Programmable Read Only Memory (EEPROM), flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for processing a data packet associated with a service session are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A method for processing a data packet associated with a service session, the method comprising:
   receiving, by a forwarding node, the data packet directed to a first servicing node of a plurality of servicing nodes;
   sending, by the forwarding node, the data packet to the first servicing node;
   based on the data packet, creating, by the first servicing node, a first session entry associated with the service session associated with the data packet and processing, by the first servicing node, the data packet;
   sending, by the first servicing node, information associated with the first session entry to a second servicing node, the second servicing node being selected by the first servicing node based on a high availability (HA) policy received by the first servicing node from a network controller being communicatively coupled to the plurality of servicing nodes;
   based on the information associated with the first session entry, creating, by the second servicing node, a second session entry associated with the service session;
   receiving, by the forwarding node, a further data packet directed to the first servicing node, the further data packet being associated with the service session;
   getting, by the forwarding node, a notification from the network controller that the first servicing node is unavailable;
   in response to the getting, selecting, by the forwarding node, the second servicing node from the plurality of servicing nodes, the selecting of the second servicing node being based on the HA policy received by the forwarding node from the network controller;
   sending, by the forwarding node, the further data packet to the second servicing node; and
   processing, by the second servicing node, the further data packet of the service session based on information stored in the second session entry.

2. The method of claim 1, wherein the HA policy includes a client HA policy.

3. The method of claim 1, further comprising:
   receiving the further data packet by the second servicing node;
   determining, by the second servicing node, that the further data packet includes a service request;
   selecting, by the second servicing node, a server operable to serve the service session; and
   sending, by the second servicing node, the further data packet to the server, the server being associated with a server network address,
   wherein the sending the further data packet to the server includes sending the data packet to a third servicing node, the third servicing node being associated with the server.

4. The method of claim 3, wherein the server is selected by the second servicing node based on a service policy.

5. The method of claim 3, further comprising:
   associating, by the second servicing node, the second session entry with a network address translation (NAT) address, wherein the second service session includes a client service session; and
   establishing, by the second servicing node, based on the NAT address, a further service session, wherein the further service session includes a server service session.

6. The method of claim 5, further comprising:
   extracting, by the second servicing node, at least one of a client network address and a service address from the further data packet; and
   storing, by the second servicing node, the client network address and the service address in the second session entry.

7. The method of claim 6, further comprising:
   receiving, by the second servicing node, from the server, the data packet;
   processing the data packet by the second servicing node to obtain a processed data packet;
   retrieving, by the second servicing node, the client network address from the second session entry; and
   sending, by the second servicing node, the processed data packet to a client device, the client device being associated with the client network address.

8. The method of claim 1, further comprising:
   receiving, by the first servicing node, the HA policy, the HA policy including an indication to the second servicing node;
   updating, by the first servicing node, the first session entry to obtain an updated session entry; and sending, by the first servicing node, the updated session entry to the second servicing node.

9. The method of claim 1, further comprising:
receiving, by the forwarding node, an availability indication from the second servicing node.

10. A system for processing a data packet associated with a service session, the system comprising a processor with memory, the processor executing:
a plurality of servicing nodes; a first servicing node being configured to:
based on the data packet, create a first session entry associated with the service session associated with the data packet and process the data packet;
send information associated with the first session entry to a second servicing node, the second servicing node being selected by the first servicing node based on a high availability (HA) policy received by the first servicing node from a network controller being communicatively coupled to the plurality of servicing nodes;
the second servicing node being configured to:
based on the information associated with the first session entry, create a second session entry associated with the service session;
process a further data packet of the service session based on information stored in the second session entry;
the network controller communicatively coupled to the plurality of servicing nodes; and
a forwarding node, the forwarding node being operable to:
receive the data packet directed to the first servicing node of the plurality of servicing nodes;
receive the further data packet directed to the first servicing node, the further data packet being associated with the service session;
get a notification from the network controller that the first servicing node is unavailable;
in response to the getting, select the second servicing node from the plurality of servicing nodes, the selecting of the second servicing node being based on the HA policy received by the forwarding node from the network controller; and
send the further data packet to the second servicing node.

11. The system of claim 10, wherein the HA policy includes a client HA policy.

12. The system of claim 10, wherein the second servicing node is operable to:
receive the further data packet;
determine that the further data packet includes a service request;
select a server, the server being operable to serve the service session; and
send the further data packet to the server, the server being associated with a server network address,
wherein the sending the further data packet to the server includes sending the further data packet to a third servicing node, the third servicing node being associated with the server.

13. The system of claim 12, wherein the server is selected by the second servicing node based on a service policy.

14. The system of claim 12, wherein the second servicing node is further operable to:
associate the session entry with a network address translation (NAT) address, wherein the second service session includes a client service session; and
establish, based on the NAT address, a further service session, wherein the further service session includes a server service session.

15. The system of claim 14, wherein the second servicing node is further operable to:
extract at least one of a client network address and a service address from the further data packet; and
store the client network address and the service address in the second session entry.

16. The system of claim 15, wherein the second servicing node is further operable to:
receive, from the server, the data packet;
process the data packet to obtain a processed data packet;
retrieve the client network address from the second session entry; and
send the processed data packet to a client device, the client device being associated with the client network address.

17. The system of claim 10, wherein the first servicing node is further operable to:
receive the HA policy, the HA policy including an indication to the second servicing node;
update the first session entry to obtain the updated session entry; and
send the updated session entry to the second servicing node.

18. The system of claim 10, wherein the forwarding node is further operable to:
receive an availability indication from the second servicing node.

19. A non-transitory computer-readable storage medium having embodied thereon a program, the program being executable by a processor to perform a method for processing a data packet associated with a service session, the method comprising:
receiving, by a forwarding node, the data packet directed to a first servicing node of a plurality of servicing nodes;
sending, by the forwarding node, the data packet to the first servicing node;
based on the data packet, creating, by the first servicing node, a first session entry associated with the service session associated with the data packet and processing, by the first servicing node, the data packet
sending, by the first servicing node, information associated with the first session entry to a second servicing node, the second servicing node being selected by the first servicing node based on a high availability (HA) policy received by the first servicing node from a network controller being communicatively coupled to the plurality of servicing nodes;
based on the information associated with the first session entry, creating, by the second servicing node, a second session entry associated with the service session;
receiving, by the forwarding node, a further data packet directed to the first servicing node, the further data packet being associated with the service session;
getting, by the forwarding node, a notification from the network controller that the first servicing node is unavailable;
in response to the getting, selecting, by the forwarding node, the second servicing node from the plurality of servicing nodes, the selecting of the second servicing node being based on the HA policy received by the forwarding node from the network controller; and
sending, by the forwarding node, the further data packet to the second servicing node; and processing, by the second servicing node, the further data packet of the service session based on information stored in the second session entry.

20. The method of claim 1 further comprising:

processing, by the forwarding node, the data packet using applications, the applications including deep packet inspection, account and billing, virus detection, and intrusion detection.

\* \* \* \* \*